Figure 1:
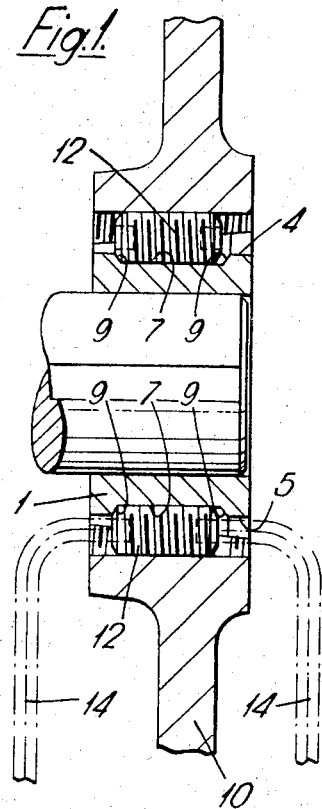

United States Patent [19]
Boole

[11] 3,851,977
[45] Dec. 3, 1974

[54] SHAFT MOUNTINGS FOR PULLEYS, SPROCKETS, COUPLING FLANGES AND OTHER MACHINE ELEMENTS

[75] Inventor: Rex Boole, Croydon, England

[73] Assignee: The Wellman Bibby Company Limited, Croydon, Surrey, England

[22] Filed: Dec. 15, 1971

[21] Appl. No.: 208,201

Related U.S. Application Data

[63] Continuation of Ser. No. 880,700, Nov. 28, 1969, abandoned.

[52] U.S. Cl. .................................. 403/16, 403/370
[51] Int. Cl. ............................................. F16d 1/06
[58] Field of Search ........ 287/52.06, 52.04; 85/155; 403/370, 371, 16

[56] References Cited
UNITED STATES PATENTS

| | | | |
|---|---|---|---|
| 2,402,743 | 6/1946 | Firth | 287/52 R |
| 2,509,711 | 5/1950 | Williams | 287/52.06 UX |
| 2,570,604 | 10/1951 | Siegerist | 287/52.06 UX |
| 2,571,699 | 10/1951 | Firth | 287/52.06 |
| 2,723,138 | 11/1955 | Knudsen | 287/52.06 |
| 2,763,158 | 9/1956 | Firth | 287/52.06 X |
| 2,856,211 | 10/1958 | Firth | 287/52.06 |
| 3,682,505 | 8/1972 | Firth | 403/370 |

FOREIGN PATENTS OR APPLICATIONS 554,729   1/1957   Italy ...................................... 85/155

Primary Examiner—Andrew V. Kundrat
Attorney, Agent, or Firm—Bacon & Thomas

[57] ABSTRACT

A split contractible tapered bush for use in mounting a machine element having a tapered bore on a shaft, is recessed in its tapered face so as partially to receive at least two locking screws parallel to the axis of the shaft each of said screws being also partially received in a registering recess in the bore, the recessed portions in the bush for said screws having an abutment against which such screws can bear to urge the bush into engagement with the bore, the recessed portion for one screw having an opposed abutment for withdrawal of the bush wherein grooves or apertures are formed in the abutments to permit actuation of the screws from either end of the mounting.

7 Claims, 22 Drawing Figures

Inventor
REX BOOLE
By Bacon & Thomas
Attorneys

Inventor
REX BOOLE
By Bacon & Thomas
Attorneys

Inventor
REX BOOLE
By Bacon & Thomas
Attorneys

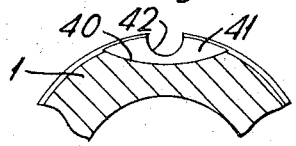
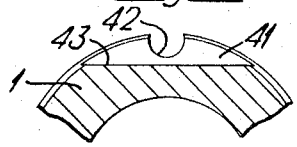
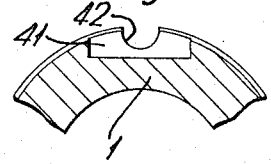
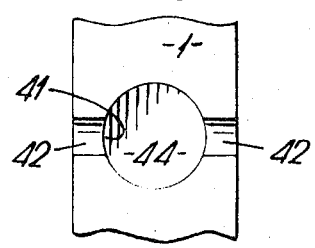
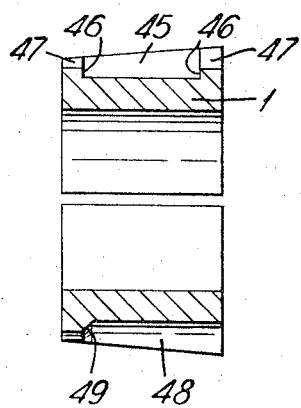
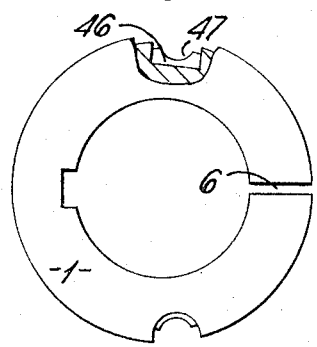
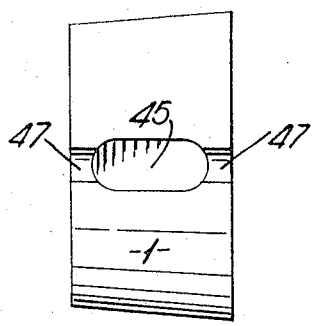

Inventor
REX BOOLE
By Bacon & Thomas
Attorneys

SHAFT MOUNTINGS FOR PULLEYS, SPROCKETS, COUPLING FLANGES AND OTHER MACHINE ELEMENTS

This is a continuation of application Ser. No. 880,700, filed Nov. 28, 1969, now abandoned.

This invention concerns improvements in or relating to the mounting on shafts of pulleys, sprockets, coupling flanges and other machine elements by means of a longitudinally split contractable tapered bush. Such a bush is normally arranged to fit into a tapered bore in the hub of a machine element, the shaft on which the element is to be mounted being passed through the uniform bore of the bush. Upon the application of pressure to the bush in the direction of taper, reaction between the tapered bore and the tapered bush causes the latter to contract and thus to grip the shaft.

This method of mounting is well known, and numerous arrangements for urging the bush into the tapered bore have been proposed. For example, one method of carrying this out consists in providing tapped holes in the hub of a machine element, the axes of such holes being substantially parallel to that of the shaft, grooves or recesses being formed in the bush in such a way that the heads of screws threadedly engaged with the tapped holes in the hub, will enter the grooves or recesses in the bush so that rotation of the screws serves to urge the bush into or out of engagement with the hub. This arrangement, however, has several disadvantages. For example it was necessary to provide a somewhat substantial hub to accommodate the threaded holes without undue reduction in strength; most arrangements required the bush to protrude from the hub since the screw heads had to be clear of the threaded holes, thus providing a somewhat cumbersome extension. In another arrangement a mounting was provided wherein locking screws extended substantially parallel with the hub axis each of said screws being contained for at least the major portion of its length partly in an arcuate recess in the bore of the hub and partly in a registering arcuate recess in the tapered surface of the bush, the screws being in threaded engagement with either the hub or the bush and co-active with the other so that turning of the screws caused the bush to be urged into engagement with the hub. Such a mounting will henceforth be termed "of the kind referred to." Thus either the hub recesses or the bush recesses were threaded and adapted to receive the locking screws whilst the recesses in the other member were plain, and were provided with blind ends against which, upon assembly of the mounting, the screws bore to urge the bush into engagement with the hub as already indicated.

Although this latter mounting overcomes the need for threaded bores formed wholly in the hub and avoids the need to use headed screws engaging in grooves or recesses in the hub it was subject to other disadvantages. Thus firstly, in order to be able to dismount the assembly it is necessary to provide means by which the bush, upon release of the locking screws, can be forced out of the tapered bore. One arrangement for this purpose comprises the provision of one or more pairs of aligned arcuate recesses formed in the bush and the hub one of each pair of recesses being threaded and the other being plain, said recesses being adapted to receive a screw threrein. When the bush is to be removed the screw will be tightened until a part of it, e.g., its end, bears against the blind end formed at or near said plain further recess so that further tightening of the screw thereafter acts forcibly to urge the bush out of the bore.

A second drawback of this known arrangement is that for any particular construction of hub and bush, the said locking screws can only be actuated from one end of the bush. Thus should that end be inaccessible or restricted in some way such as for example by proximate machine parts or the like, then a suitably tapered hub and bush giving access to the screws where required must be employed. This second drawback leads to the requirement that to ensure that any mounting may satisfactorily be achieved a number of types of hub and bush of each size but with oppositely directed tapers or access must be kept in stock.

The invention aims at eliminating the above-mentioned drawbacks in a mounting of the kind referred to by permitting withdrawal of the bush merely by the actuation of said locking screws, thus eliminating the need for special means for withdrawal of the bush, and by permitting access to said locking screws from either end of the bush, so that better standardization of parts is made possible. Accordingly this invention provides a split contractible tapered bush for use in a mounting of the kind referred to said bush having recesses in its tapered surface so as to receive at least two screws the recessed portions for said screws having a shoulder or like abutment against which such a screw can bear in operation such that rotation of the screw will serve to urge the bush into engagement with the tapered bore of a hub, the recessed portion for at least one screw being provided with an opposed shoulder or abutment against which such screw, when rotated in the opposite direction, can bear to urge the bush out of engagement, grooves or apertures being formed in the ends of the bush or in the shoulders or like abutments so as to enable access for actuation of the screws to be obtained from each end of the bush.

The recessed portion or portions which is bounded by two opposed shoulders or abutments and if desired, the recessed portion bounded at one end only by a shoulder or abutment can be formed, for instance, as a scallop-shaped or flat-based recess in the tapered surface of the bush intermediate its ends, or again by forming such recesses by using an end milling tool. Again, if desired, the tapered surface of the bush intermediate its ends can be of a cylindrical shape forming an annular recess extending around the bush between shoulders at each end, which annular recess receives all the said screws.

In all these cases grooves, or apertures, will be formed in the two ends of the bush to give access to screws therein from each end. It will be appreciated that since these recessed portions do not positively locate the screws, the screw seated in the recessed portion bounded at one end only by a shoulder or abutment should always be long enough to extend from its co-operating shoulder or abutment at one end of the bush into the said groove or aperture at the other end of the bush so as to act as a key when inserting the bush and screws into a machine element.

In one preferred arrangement, the recessed portions for said screws comprise at least two longitudinal open-ended grooves, each of said grooves being adapted partially to embrace a screw longitudinally. Preferably the grooves in the tapered bore of the machine element will be threaded, while the grooves in the tapered surface of the bush are plain but it will be understood that the scope of the invention also extends to the provision of threaded grooves in the tapered surface of the bush and plain grooves provided with suitable abutments in the bore of the element. In this case it will be understood that the abutments in each groove of a tapered bush against which in operation the screw can bear will be provided by the flanks of the thread.

Whilst, if desired, all said grooves can be provided with two opposed shoulders or like abutments it will be understood that for the smaller sizes of elements and bush two grooves may be provided only one of which is provided with two opposed shoulders or abutments for moving the bush in either direction whilst the other groove may have only a single shoulder or abutment for use in inserting the bush.

The or each abutment in the plain grooves in the tapered surface of the bush may be provided by grub screws extending into the grooves, or by circlips mounted in circumferential grooves extending around the tapered periphery of the bush, such that a portion of each of said circlips extends into each of the said plain grooves. In a preferred arrangement, however, each plain groove is formed with a central portion adapted partially to embrace said screw the longitudinally outer portions of the grooves being narrower than said central portion, said shoulders or like abutments being thus formed at the junctions therebetween.

It will be appreciated that the scope of the invention also extends to a mounting comprising a combination of a machine element having a tapered bore with longitudinal open-ended grooves disposed therein, and a bush having any of the preferred features set forth above. It will further be seen that in such a mounting, rotation of the screws in one direction will be effective to urge the bush into engagement with the bore, causing the bush to contract, whereas rotation of the screws in the other direction will permit release and subsequent withdrawal of the bush. The screws will preferably be headless, and preferably be provided with a shaped recess at each end, adapted to be engaged by driving means, such as for example, a hexagonal wrench.

A further feature of the invention resides in the provision of a machine part mounted on a shaft through the intermediary of a split contractible tapered bush and at least two locking screws extending substantially parallel to said shaft each of said screws being contained for at least the major portion of its length partly in a recess in the bore of the machine part and partly in a registering recess in the tapered surface of the bush, at least one recess in the tapered surface of the bush being threaded and arranged to cooperate with a plain recess in the surface of the bore of the machine part which plain recess is defined by two opposed shoulders or abutments means being provided which enable access for actuation of both of said screws from each end of said bush.

It will be appreciated that the present invention in obviating the need to provide separate means by which the bush can be forced out of the tapered bore, and the need to provide a number of types of hub and bush of each size but with oppositely directed tapers or access, shows a substantial improvement over the prior art.

Figure 2:
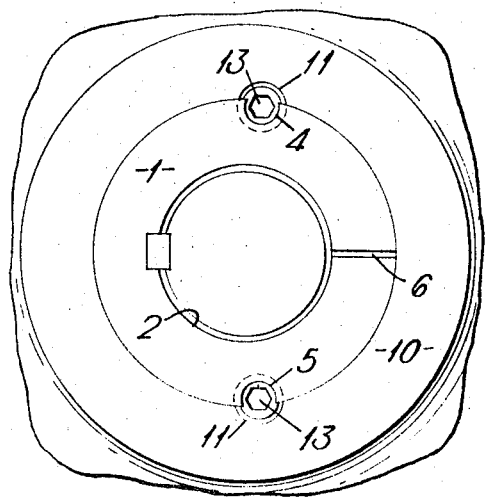
Figure 3:
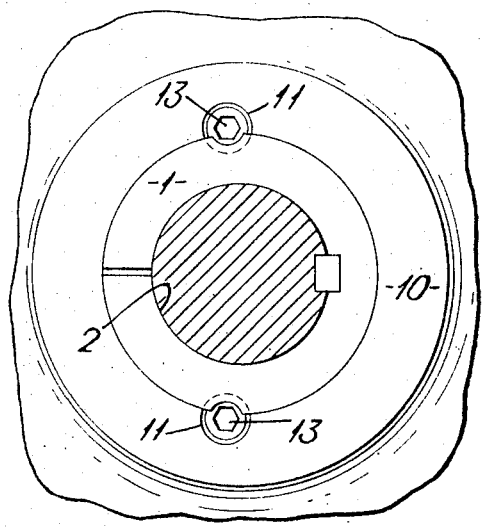
Figure 4:
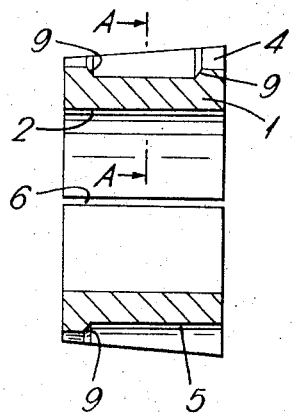
Figure 5:
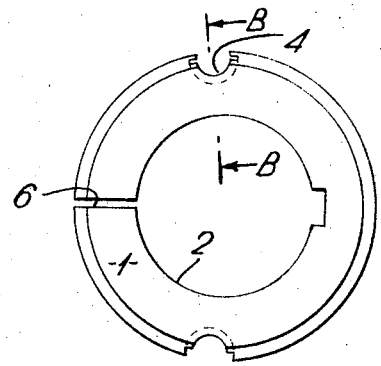
Figure 6:
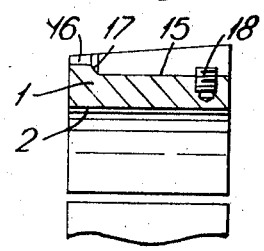
Figure 7:
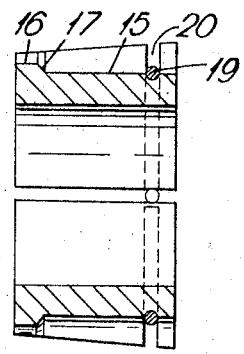
Figure 8:
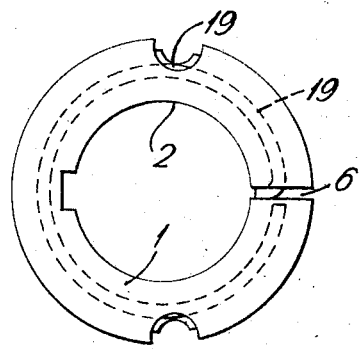
Figure 9:
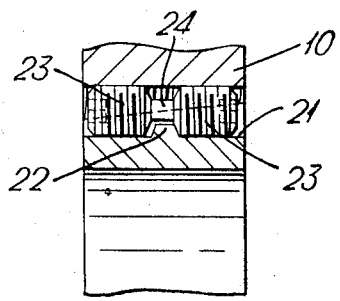
Figure 22:
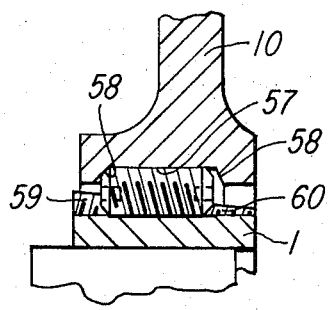
Figure 10:
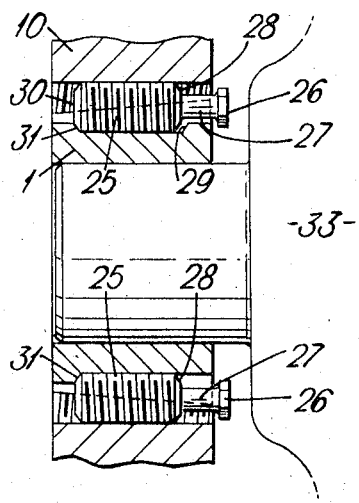
Figure 11:
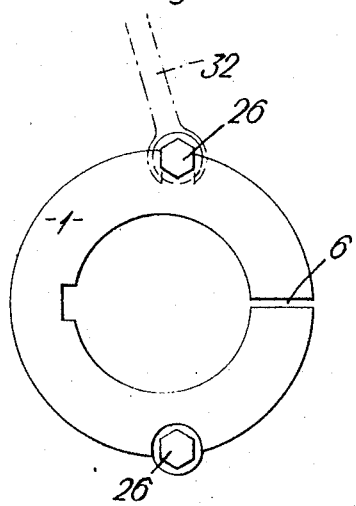
Figure 19:
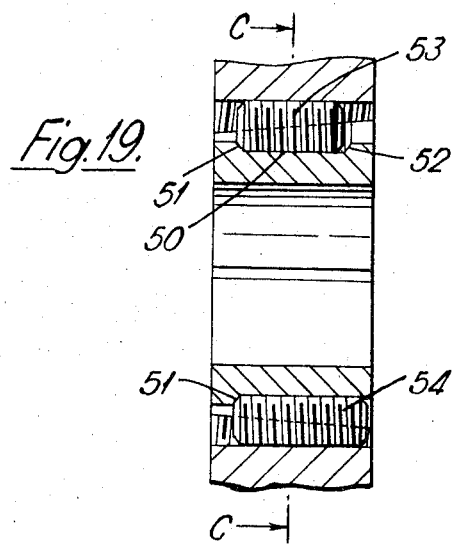
Figure 20:
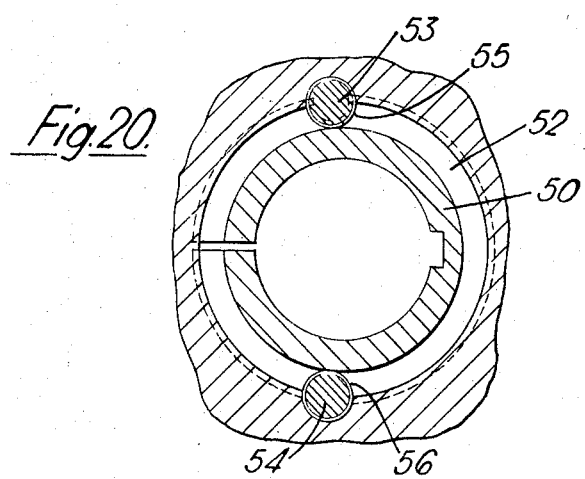
Figure 21:
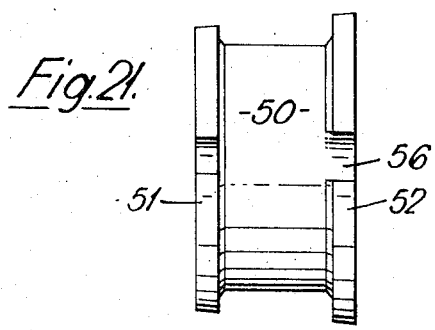

In order readily to understand the invention and to appreciate the advantages gained thereby, certain embodiments thereof will now be described by way of example and with reference to the accompanying drawings in which:

FIG. 1 is a cross-section through a split contractible tapered bush according to the invention serving to couple a machine element to a shaft, FIG. 2 is an end view of the larger end of the bush, FIG. 3 is an end view of the smaller end of the tapered bush of FIG. 1, FIG. 4 is a cross-section through a bush modified by having opposed shoulders for only one screw, FIG. 5 is an end view of FIG. 4, FIG. 6 is a section on line B—B of FIG. 5 and shows an embodiment using a grub screw as a shoulder, FIG. 7 is a section similar to that of FIG. 4 showing a circlip forming one shoulder, FIG. 8 is an end view of FIG. 7, FIG. 9 is a cross-sectional view similar to that of FIG. 6 and shows a further embodiment of tapered bush, FIG. 10 is a cross-sectional view similar to that of FIG. 4 and showing modified screws for use where only very limited access is available, FIG. 11 is an end view of the bush of FIG. 10, FIGS. 12, 13 and 14 are sectional part views taken on line A—A of FIG. 4 and showing three alternative ways of forming a recess in the tapered surface of a bush according to the invention, FIG. 15 is a side view of the bush of FIG. 14, FIG. 16 is an axial cross-section through another embodiment of bush having a milled recess in its tapered surface, FIG. 17 and 18 are an end view and a side view respectively of the bush of FIG. 16, FIG. 19 is an axial cross-section of yet another recessed bush according to the invention, FIG. 20 is a section on line C—C of FIG. 19, FIG. 21 is an underneath plan view of the bush of FIG. 20, and FIG. 22 is a fragmentary section of a still further modification.

Refering firstly to FIGS. 1 to 3 which show a first embodiment of split contractible tapered bush according to the invention, the bush 1 has a bore 2 of uniform diameter. The tapered face of the bush 1 is recessed by the provision of two longitudinal open-ended grooves 4, 5 which are substantially diametrically opposed, each being located at roughly ninety degrees around the circumference of the tapered face from the split 6. The grooves 4, 5 are not threaded and are formed each with an arcuate central portion 7, and two longitudinal arcuate outer portions which are narrower than the central portion 7. A shoulder 9 is thus formed at the junction between each outer portion and the central portion 7, the two shoulders 9 in each groove facing opposite directions.

This bush can be used with a machine element such as element 10 whose hub is of a known kind, having two substantially diametrically opposed longitudinal arcuate open-ended threaded grooves 11 disposed in the tapered bore thereof. Such threaded grooves 11 will correspond with the grooves 4, 5 on the tapered face of the bush 1 when the latter is inserted into the bore. In order to assemble the mounting a headless hexagonal socketed screw 12 is positioned in the central portion 7 of each of said grooves 4, 5 with a recessed end 13 facing the broader end of the bush, and the tapered end of the bush is inserted into the wider end of the hub bore so that the screws 12 are aligned with the threaded grooves 11 in said bore. Thereupon the screws 12 are rotated by a hexagonal wrench 14 such that they engage the threaded grooves 11 and each bears against one of the shoulders 9 in each groove 4, 5 of the bush to urge the bush 1 into the bore. Upon the tapered face of the bush contacting the bore, further turning of the screws in that direction will be effective to cause the bush to contract.

It will be apparent that the screws 12 may, if required, be positioned in said central portion 7 with their recessed ends 13 facing in the direction of taper, in which case the hexagonal wrench could be inserted into the grooves from the tapered end of the bush. Furthermore headless screws provided with a hexagonal recess 13 at each end as shown may be employed in which case the screws 12 may be actuated from either end of the mounting.

In order to withdraw the bush 1 from the bore, all that is required is to turn said screws 12 in the opposite direction from that which causes the bush to engage said bore, such turning causing each screw 12 to bear against the other shoulder 9 in each groove 4, 5 thus urging the bush 1 out of the bore.

FIGS. 4 and 5 show a modified form of bush from that shown in FIGS. 1 to 3 in that whilst the recessed groove 4 has two opposed shoulders 9 by which, in cooperation with a screw, the bush can be moved in either direction, only one shoulder 9 serving to move the bush into engagement is provided in groove 5. Such a form of bush is generally suitable for smaller sizes.

FIG. 6 shows a bush 1 which is generally similar to that of FIGS. 1 to 3 except that the longitudinal openended grooves of which only one is shown are each formed with an arcuate first part 15 which extends along the tapered face from the broader end of the bush roughly three-quarters of the distance to the narrower end, and a second arcuate part 16 narrower than said first part, extending along the remainder of the tapered face to the narrower end, a shoulder 17 being formed at the junction between the two parts.

About one-third of the distance along each first part 15 from the broader end of the bush, there is provided a grub screw 18 threadedly located in a threaded hole which extends substantially at right angles to the axis of the bush 1 between the bore 2 of the bush and said first part 15. The grub screw 18 extends into said first part 15 thus forming an abutment, while allowing access to actuate a locking screw which may be positioned between said shoulder and said abutment.

It will be seen that this bush will function in a manner similar to that above described with respect to FIGS. 1 to 3.

FIG. 7 shows a bush 1 generally similar to that of FIG. 6. However, the abutments in this case are formed by a circlip 19 which is located in a holding groove 20 which extends around the periphery of the tapered face of the bush 1, and has a depth substantially equal to the depth of the said first part 15. The ends of the circlip 19 are bent into the split 6 to prevent turning of said circlip in use. Again, it will be noted that this bush will function in a similar manner to that described with respect to FIGS. 1 to 3.

Another embodiment is shown in FIG. 9 and comprises a longitudinally split contractible tapered bush 1 having a uniform bore 2. Disposed in the tapered face thereof are two diametrically opposed longitudinal open-ended grooves only one of which is shown, each being located at roughly 90° around the circumference of the tapered face from the split. Each such groove 21 is arcuate and of generally uniform diameter, each having a ridge 22 formed therein roughly midway between the ends of the bush. Such a bush may be used with a machine element 10 whose hub is of the known kind set forth above. In this case a headless dumb-bell screw having two major coaxial threaded portions 23 connected by a narrower coaxial neck portion 24 is used, each of said major portions 23 having therein a hexagonal socket 24 located in the outer end thereof.

In order to assemble this bush into the hub, the screws are positioned in the grooves 21 in the tapered face of the bush so that said neck portion 24 overlies said ridge 22. The bush is then inserted into the bore of the hub so that the screws are aligned with the threaded grooves in said bore. Thereupon the screws are rotated by means of a hexagonal wrench which may be applied from either end of the bush such that said dumb-bell screws engage the threaded grooves, and the major portion 23 of each screw which is adjacent the broader end of the bush bears against the adjacent part of the corresponding ridge 22 to urge the bush into the bore.

It will be seen that rotation of each said dumb-bell screw in the opposite sense to that mentioned above will cause the major portion 23 thereof nearer the narrower end of the bush to bear against the adjacent part of the corresponding ridge 22, to urge said bush out of the bore. Thus ridge 22 constitutes the abutment or shoulder which serves to move the bush in a direction depending on the direction of rotation of the screw.

FIGS. 10 and 11 show another embodiment of bush similar to that shown in FIG. 4, it will however be noted that instead of using socketed screws as shown in FIGS. 1 to 3, screws 25 are provided which have thin bolt heads 26 of hexagonal shape connected to the screws 25 by a shaft 27 which defines a shoulder 28 to bear against shoulder 29 at one end of one groove, whilst screw end 30 will bear against shoulder 31 at the other end of each groove.

The hexagon head is of such size that it can enter the grooves 11 in machine element 10. The particular advantage of this embodiment arises when the space available for access to the end of the screws is so restricted by another machine part such as 33 that a hexagonal wrench could not be used. As indicated a thin flat spanner 32 can engage head 26. If desired such a bolt head 26 could be provided at each end of each screw 25.

FIGS. 12 to 21 inclusive all show embodiments wherein the tapered surface of the bush is recessed to receive the screws but the recessed portions for at least one of the screws are not in the form of grooves which embrace half the periphery of the screws. In the case of all the embodiments of FIGS. 12 to 21 threaded half grooves will be provided in the bore of the machine element with which these bushes are used.

FIG. 12 shows how a scalloped recess 40 can be milled out of the tapered surface of bush 1. At each side of recess 40 a shoulder 41 (only one of which is shown) will be formed against which a screw can be caused to bear in a manner indicated above. To give access to the end of such screw a groove or aperture 42 will be formed through each shoulder 41. This bush can be provided with a second recessed portion in the form of a groove having a shoulder at one end only as in the case of groove 5 of FIG. 4 or such recessed portion can again be milled out of the tapered surface of the bush in a manner similar to recess 40. With such a bush a screw will be provided for the groove or recess having only one shoulder which is long enough to extend through the groove or aperture in the end of the bush remote from the shoulder so as to act as a key when inserting the bush into the bore of a machine element.

FIG. 13 shows a similar embodiment to that of FIG. 12 except that a flat based recess 43 is provided in place of the scalloped recess 40 of FIG. 12. Shoulders 41 are again provided having apertures.

FIGS. 14 and 15 show a recess 44 formed in the tapered surface of bush 1 by means of a large end milling tool. Again shoulders 41 and grooves or apertures 42 are provided.

FIGS. 16 to 18 show a similar embodiment to that of FIGS. 14 and 15 except a small diameter end milling tool is used to form an elongate recess 45 to receive a screw. Shoulders 46 at each end of recess 45 have grooves or apertures 47 therethrough to give access to the screw ends. Opposite recess 45 a longitudinally extending groove 48 having only one shoulder 49 similar to groove 5 in FIG. 4 is provided.

FIGS. 19 to 21 show yet another embodiment of bush having a recessed portion. In this case the central part of the tapered bush is turned down to a cylindrical portion 50. This leaves flanges 51, 52, at the ends of the bush which constitute shoulders or abutments for screws 53, 54. Grooves or apertures 55, 56 are provided to give access to the screws and it will be noted that groove 56 is large enough to enable screw 54 to extend from shoulder 51 through groove 56 so that it can serve as a key to locate the bush against rotation when it is being inserted into a machine element. FIG. 22 is a fragmentary section of a further modification similar to FIG. 1 but wherein a plain unthreaded recess 57 is provided in the hub of the machine part 10 having the abutments 58 therein. In this form the recess 59 in the bush 1 is provided with the internal threads 60. It will be obvious that this form of the invention functions in exactly the same way as described with reference to FIG. 1, the threaded and unthreaded parts merely being reversed.

I claim:

1. A machine part mounted on a shaft through the intermediary of a split contractible tapered bush and at least two locking screws extending substantially parallel to said shaft, each of said screws being contained for at least the major portion of its length partly in a recess in the bore of the machine part and partly in a registering recess in the tapered surface of the bush, at least one recess in the tapered surface of the bush being threaded and arranged to cooperate with a plain recess in the surface of the bore of the machine part, the ends of said plain recess being defined by two opposed shoulders or abutments, means being provided which enable access for actuation of both of said screws from each end of said bush.

2. In a mounting wherein a contractible tapered bush fits a tapered opening in a machine part, said bush and machine part having facing recesses in their tapered surfaces and a locking screw housed in said facing recesses, extending axially therein, and being threadedly engaged with only one of said bush and machine part, the improvement comprising:

spaced abutments in the recess of the other of said bush and machine part and selectively engageable by the ends of said screw to force said bush into or out of said machine part, said abutments being configured to provide access to said screw, for actuating the same, from at least one end of said bush.

3. A mounting as defined in claim 2 wherein said recesses are in the form of open-ended longitudinal grooves, each being configured to partially embrace said screw.

4. A mounting as defined in claim 3 wherein said groove in said bush is unthreaded.

5. A mounting as defined in claim 4 wherein at least one of said abutments comprises a grub screw in its associated groove.

6. A mounting as defined in claim 4 wherein at least one abutment in said groove of said bush is provided by a circlip in a circumferential groove extending around the tapered periphery of said bush.

7. A mounting as defined in claim 4 wherein said groove in said bush is formed with a central portion of a size to partially embrace said screw and smaller outer portions, the junctures between said central and outer portions comprising said abutments.

* * * * *